(12) United States Patent
Suga

(10) Patent No.: US 9,604,360 B2
(45) Date of Patent: Mar. 28, 2017

(54) ROBOT SYSTEM FOR PREVENTING ACCIDENTAL DROPPING OF CONVEYED OBJECTS

(71) Applicant: FANUC CORPORATION, Minamitsuru-gun, Yamanashi (JP)

(72) Inventor: Keisuke Suga, Yamanashi (JP)

(73) Assignee: Fanuc Corporation, Yamanashi (JP)

( * ) Notice: Subject to any disclaimer, the term of this patent is extended or adjusted under 35 U.S.C. 154(b) by 0 days.

(21) Appl. No.: 14/623,044

(22) Filed: Feb. 16, 2015

(65) Prior Publication Data

US 2015/0231785 A1 Aug. 20, 2015

(30) Foreign Application Priority Data

Feb. 17, 2014 (JP) ................................. 2014-027387

(51) Int. Cl.
*B25J 9/16* (2006.01)
(52) U.S. Cl.
CPC ............. *B25J 9/163* (2013.01); *B25J 9/1671* (2013.01); *G05B 2219/40382* (2013.01);
(Continued)
(58) Field of Classification Search
CPC ........ B25J 9/163; B25J 9/1671; B25J 9/1612; B25J 9/1628; B25J 9/1653–9/1656; B25J 9/1664; B25J 19/02–19/025; B25J 9/1605; G05B 2219/40478; G05B 2219/40382; G05B 19/0425; G05B 19/0428; G05B 19/048; G05B 19/406–19/4061; G05B 19/42–19/4202; G05B 2219/39087; G05B 2219/40607; G05B 2219/40611; G05B 2219/40543; G05B 2219/40544; G05B 2219/40474; G05B 2219/40439;
(Continued)

(56) References Cited

U.S. PATENT DOCUMENTS 4,482,968 A * 11/1984 Inaba ..................... B25J 9/1676
318/568.13
4,490,660 A * 12/1984 Tsuchihashi ........... B25J 19/023
250/559.33
(Continued)

FOREIGN PATENT DOCUMENTS

CN 101034418 9/2007
CN 101309782 11/2008
(Continued)

*Primary Examiner* — Bao Long T Nguyen
(74) *Attorney, Agent, or Firm* — RatnerPrestia

(57) ABSTRACT

A robot system comprises a robot provided with a robot arm and a robot hand, and a control device for controlling the motion of the robot, wherein a permitted area where a teaching operation for the robot hand should be permitted is preset within a maximum area which the robot hand can reach. The control device is provided with a judging part which judges if the robot hand as a whole is present in the permitted area, based on robot hand position information, and a teaching operation restricting part which permits a teaching operation for the robot hand when it is judged that the robot hand as a whole is present in the permitted area and prohibits a teaching operation for the robot hand when it is judged that the robot hand as a whole is not present in the permitted area.

8 Claims, 9 Drawing Sheets

(52) U.S. Cl.
CPC ... *G05B 2219/40478* (2013.01); *Y10S 901/03* (2013.01); *Y10S 901/30* (2013.01); *Y10S 901/47* (2013.01)

(58) Field of Classification Search
CPC ......... G05B 2219/40317; Y10S 901/03; Y10S 901/07; Y10S 901/30; Y10S 901/45; Y10S 901/46–901/47; Y10S 901/50
USPC .... 700/250, 253, 255, 257, 258, 259; 901/3, 901/7, 30, 45, 46, 47, 50; 318/568.13, 318/568.16, 568.21
See application file for complete search history.

(56) References Cited

U.S. PATENT DOCUMENTS

| | | | |
|---|---|---|---|
| 5,956,465 A * | 9/1999 | Takagi | G05B 19/41815 700/178 |
| 2004/0012363 A1* | 1/2004 | Simondet | B25J 9/1692 318/568.21 |
| 2006/0108960 A1* | 5/2006 | Tanaka | B25J 9/1676 318/568.21 |
| 2009/0192524 A1* | 7/2009 | Itkowitz | B25J 9/1666 606/130 |
| 2010/0292843 A1* | 11/2010 | Kariyazaki | B25J 9/1676 700/264 |
| 2011/0015785 A1* | 1/2011 | Tsusaka | B25J 9/0003 700/254 |
| 2011/0213497 A1* | 9/2011 | Nair | B25J 9/1666 700/255 |
| 2012/0209428 A1* | 8/2012 | Mizutani | G05B 19/423 700/250 |
| 2012/0277912 A1* | 11/2012 | Kirihara | B25J 9/1653 700/258 |
| 2013/0054025 A1* | 2/2013 | Ito | B25J 9/1697 700/246 |
| 2013/0338827 A1* | 12/2013 | One | B25J 9/10 700/252 |
| 2014/0012419 A1* | 1/2014 | Nakajima | B25J 9/1633 700/261 |
| 2014/0018959 A1 | 1/2014 | Matsui | |
| 2014/0288706 A1* | 9/2014 | Asahi | B25J 9/1656 700/250 |

FOREIGN PATENT DOCUMENTS

| | | |
|---|---|---|
| CN | 101424935 | 5/2009 |
| CN | 103347662 | 10/2013 |
| DE | 102007014497 | 10/2008 |
| EP | 1479964 | 11/2004 |
| JP | 09-124267 | 5/1997 |
| JP | 2010155310 | 7/2010 |
| JP | 2011230243 | 11/2011 |
| WO | 2008014831 | 2/2008 |
| WO | 2012140770 | 10/2012 |

\* cited by examiner

ROBOT SYSTEM FOR PREVENTING ACCIDENTAL DROPPING OF CONVEYED OBJECTS

BACKGROUND OF THE INVENTION

1. Field of the Invention

The present invention relates to a robot system for preventing accidental dropping of a conveyed object, comprising a robot which has a robot hand which can grip a conveyed object, and a control device which controls the motion of the robot.

2. Description of the Related Art

Usually, during a teaching operation for a conveyor robot, in order to prevent a workpiece from dropping during conveyance, it is necessary to ensure that the robot hand which grips the workpiece is released only when it has reached the destination table or tray etc. In relation to this, JP-A-H9-124267 proposes the art of preventing dropping of workpieces in a conveyor, which uses a clamp to suspend a workpiece for conveyance. More specifically, the conveyor of JP-A-H9-124267 comprises a confirming means which confirms if a workpiece is seated on a tray at the destination by using a sensor, and lifts the restrictions on motion of the clamp only when it confirms that the workpiece has been seated. However, when employing the art of JP-A-H9-124267, the robot hand has to be provided with dedicated sensors and mechanical parts which constitute the confirming means, and therefore the structure of the robot hand may become complicated and the manufacturing cost of the robot hand may increase. Further, in the art of JP-A-H9-124267, it is necessary to prepare sensors and mechanical parts which are suited for the dimensions and shapes of the individual workpieces, and therefore it is difficult to achieve a robot hand which can hold a wide variety of workpieces.

A robot system which can prevent accidental dropping of conveyed objects caused by a mistaken teaching operation for the robot hand even without dedicated sensors and mechanical parts etc. provided on the robot hand, has been sought.

SUMMARY OF INVENTION

According to a first aspect of the present invention, there is provided a robot system comprising a robot which is provided with a robot arm having a wrist part and with a robot hand attached to the wrist part, and a control device which controls the motion of the robot, wherein a permitted area where a teaching operation for the robot hand should be permitted is preset within a maximum area which the robot hand can reach, and the control device comprises a judging part which judge if the robot hand as a whole is present in the permitted area, based on robot hand position information which expresses a position and posture of the robot hand, and a teaching operation restricting part which permits a teaching operation for the robot hand when it is judged that the robot hand as a whole is present in the permitted area, and prohibits a teaching operation for the robot hand when it is judged that the robot hand as a whole is not present in the permitted area.

According to a second aspect of the present invention, there is provided a robot system in the first aspect, wherein the permitted area has the shape of a convex polyhedron, sphere, or spheroid.

According to a third aspect of the present invention, there is provided a robot system in the first or second aspect, further comprising a sensor which detects the position and posture of the wrist part of the robot wherein, the control device further comprises a position calculating part which calculates the robot hand position information based on information detected by the sensor.

According to a fourth aspect of the present invention, there is provided a robot system in the first or second aspect, further comprising a vision sensor which acquires an image of the robot hand and generates the robot hand position information based on the image of the robot hand.

According to a fifth aspect of the present invention, there is provided a robot system in any of the first to fourth aspects, further comprising a model placing part which virtually places a hand model which is obtained by modelling the robot hand to simplify the shape of the robot hand, at a position expressed by the robot hand position information, wherein the judging part judges that the robot hand as a whole is present in the permitted area when the hand model as a whole is present in the permitted area, and judges that the robot hand as a whole is not present in the permitted area when the hand model as a whole is not present in the permitted area.

According to a sixth aspect of the present invention, there is provided a robot system in the fifth aspect, wherein the hand model has a box shape which circumscribes the robot hand.

According to a seventh aspect of the present invention, there is provided a robot system in any of the first to sixth aspects, wherein the judging part successively judges if the robot hand as a whole is present in the permitted area while the robot hand is moving.

According to an eighth aspect of the present invention, there is provided a robot system in any of the first to seventh aspects, wherein the robot hand is a servo-driven type robot hand.

These and other objects, features, and advantages of the present invention will become clearer with reference to the detailed description of illustrative embodiments of the present invention which are shown in the attached drawings.

DETAILED DESCRIPTION OF EMBODIMENTS

Below, embodiments of the present invention will be explained in detail with reference to the drawings. In the figures, similar component elements are assigned similar reference notations. Note that the following explanation does not limit the technical scope of the inventions which are described in the claims or the meaning of terms etc.

Figure 1:
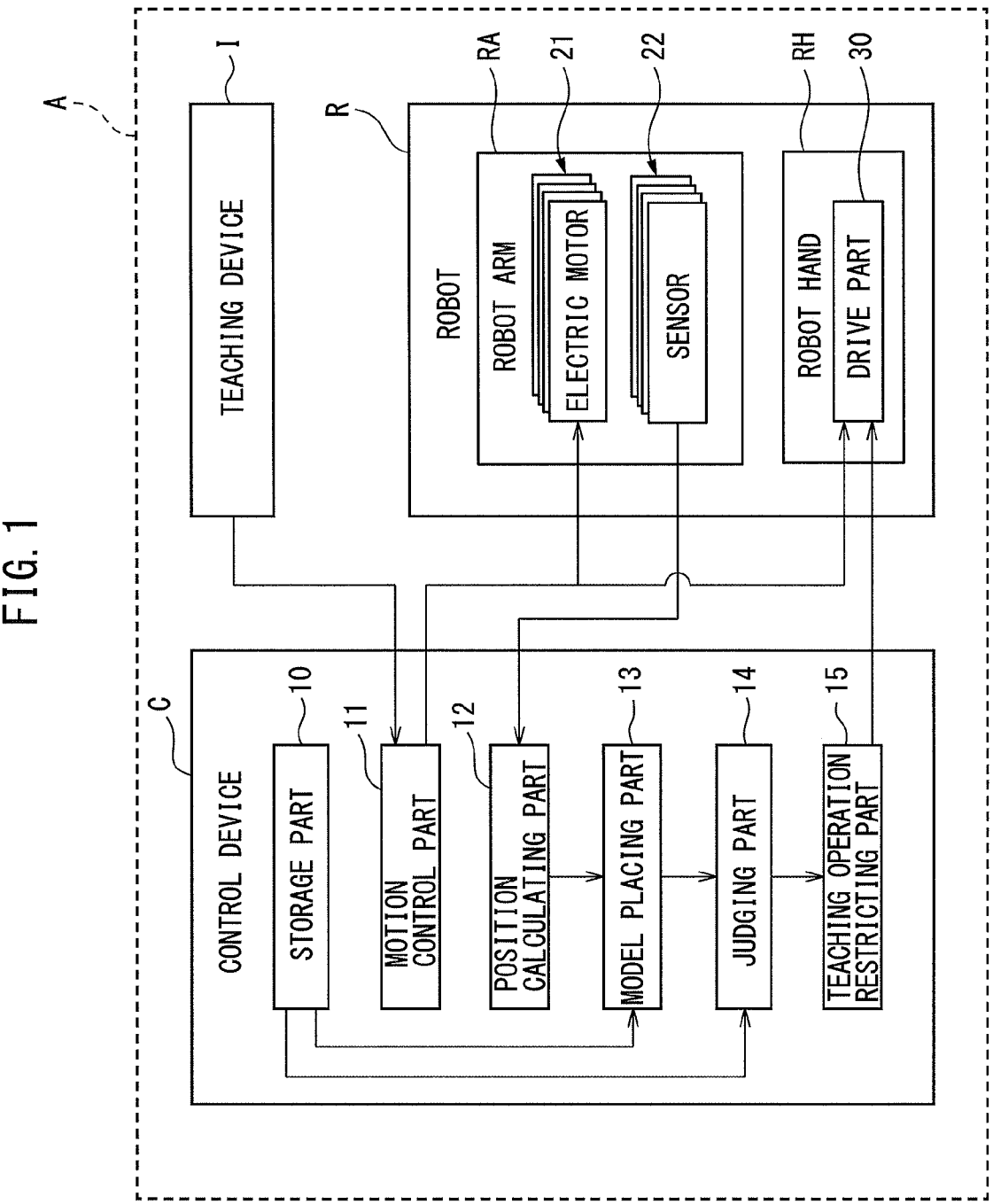
FIG. 1 is a block diagram which shows the configuration of an illustrative robot system according to an embodiment of the present invention.

FIG. 1 to FIG. 10, a robot system of one embodiment of the present invention will be explained. The robot system of the present embodiment is a conveyor system which conveys various conveyed objects, for example, non-machined parts or machined parts, on an automated production line by means of motion of a robot. FIG. 1 is a block diagram which shows the configuration of a typical robot system A of the present embodiment. As shown in FIG. 1, the robot system A of the present embodiment comprises a robot R which has a robot arm RA and a robot hand RH, a control device C which controls motion of the robot R, and a teaching device I which receives teaching operations for each part of the robot R from an operator. The teaching device I in the present example can be a teaching pendant or keyboard or other such input device. The teaching operation herein refers to making the robot R perform a desired motion so that the robot R can learn the motion.

Figure 2:
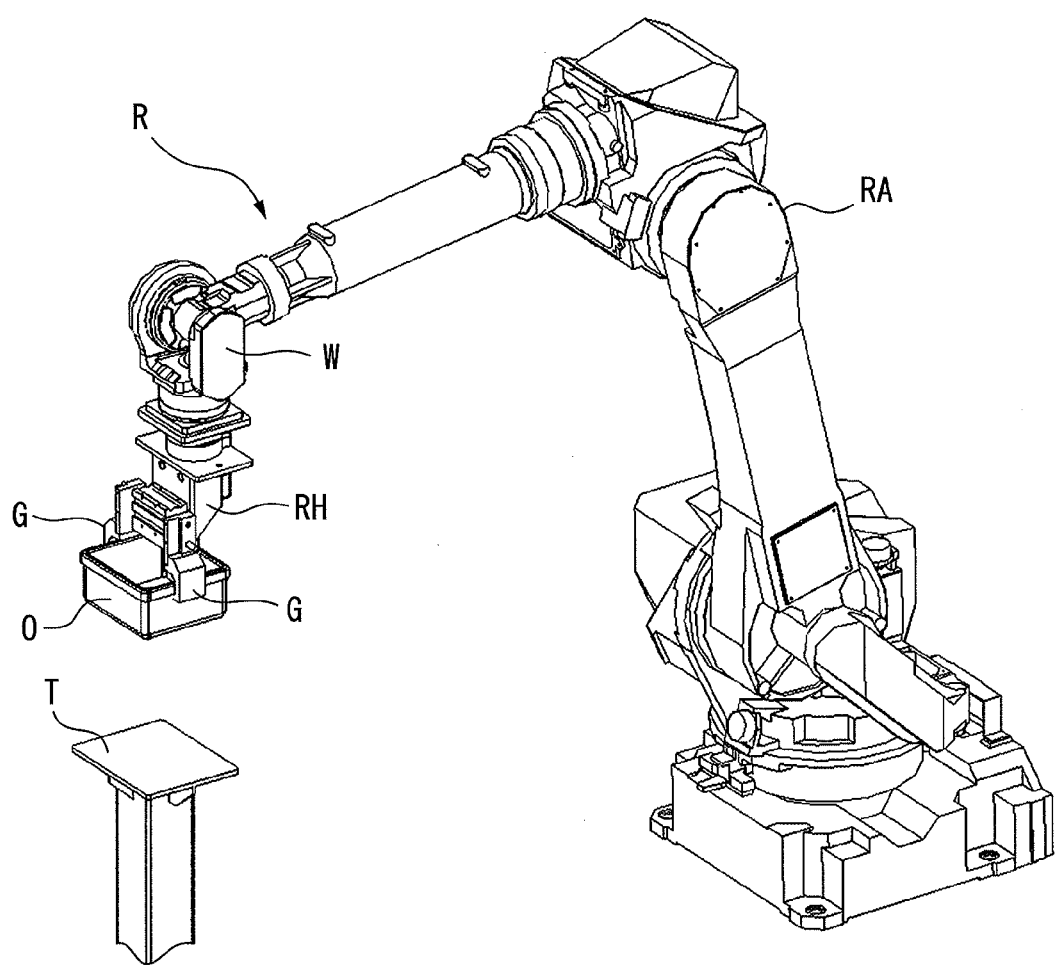
FIG. 2 is a perspective view which shows the appearance of the robot of FIG. 1.

FIG. 2 is a perspective view which shows the appearance of a robot R of the robot system A in the present example. As shown in FIG. 2, the robot R in the present example is a vertical multi-articulated robot which is provided with a robot arm RA having a wrist part W, and with a robot hand RH attached to the wrist part W. FIG. 2 illustrates a six-axis vertical multi-articulated robot, but the number of axes of the robot of the present embodiment is not limited to this. As shown in FIG. 2, the robot hand RH in the present example is provided with a pair of grippers G, G which can grip a conveyed object O. Further, the robot R in the present example can operate so as to convey a conveyed object O which is gripped by the robot hand RH from a first position to a second position in a predetermined work area in accordance with a teaching operation which is received by the teaching device I. Here, the first position of the robot R in the work area is, for example, the collection point of the conveyed objects O. The second position is, for example, a table T which is installed in a work station.

Referring again to FIG. 1, the robot arm RA of the robot R in the present example is provided with a number of drive motors 21 corresponding to the number of axes. Each of these drive motors 21 is provided with a sensor 22. The sensors 22 in the present example are general rotary encoders which are designed to detect the positions and postures of the different parts of the robot arm RA, in particular the wrist part W. The output data of the sensors 22 are transmitted to a position calculating part 12 of the control device C. Further, the robot hand RH in the present example is provided with a drive part 30 which drives the pair of grippers G, G so that they move in a direction approaching each other and in a direction separating from each other. The drive part 30 in the present example uses oil pressure or air pressure or other such fluid pressure to drive the pair of grippers G, G.

Figure 3:
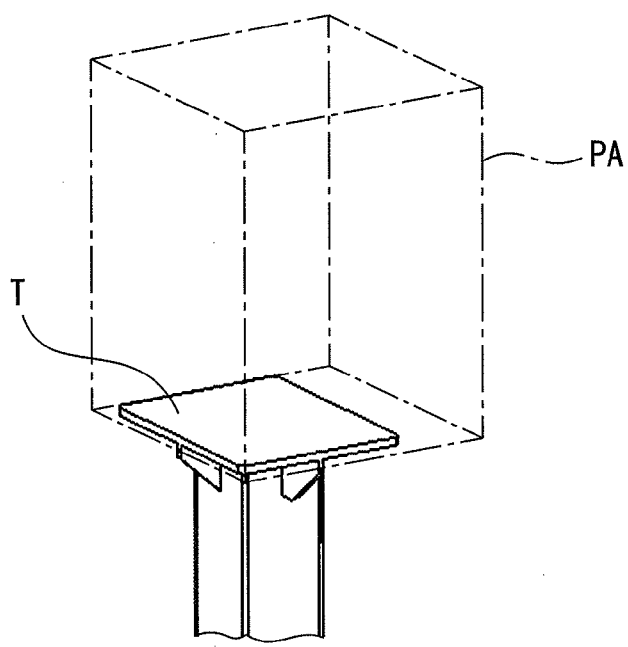
FIG. 3 is a perspective view which shows a first example of a preset permitted area.

The motions of the different parts of the robot R with the above structures are controlled by the control device C in accordance with a teaching operation which is received by the teaching device I. However, the teaching operation for the robot hand RH of the robot R is permitted only when the robot hand RH as a whole is present in a predetermined area, and thus is prohibited in other cases. Such a predetermined area will be called a "permitted area PA" below. The permitted area PA of the robot hand RH in the present example is preset by the operator within the maximum area which the robot hand RH can reach. FIG. 3 is a perspective view which shows a first example of a preset permitted area PA. In the present embodiment, a permitted area PA is set so that it has the shape of a convex polyhedron, more specifically, a box, which is positioned above a destination of the conveyed object O, that is, a table T. In this case, the operator, for example, can set a permitted area PA of a convex polyhedron shape by designating coordinates of the vertices of the convex polyhedron in a predefined reference coordinate system.

Figure 4:
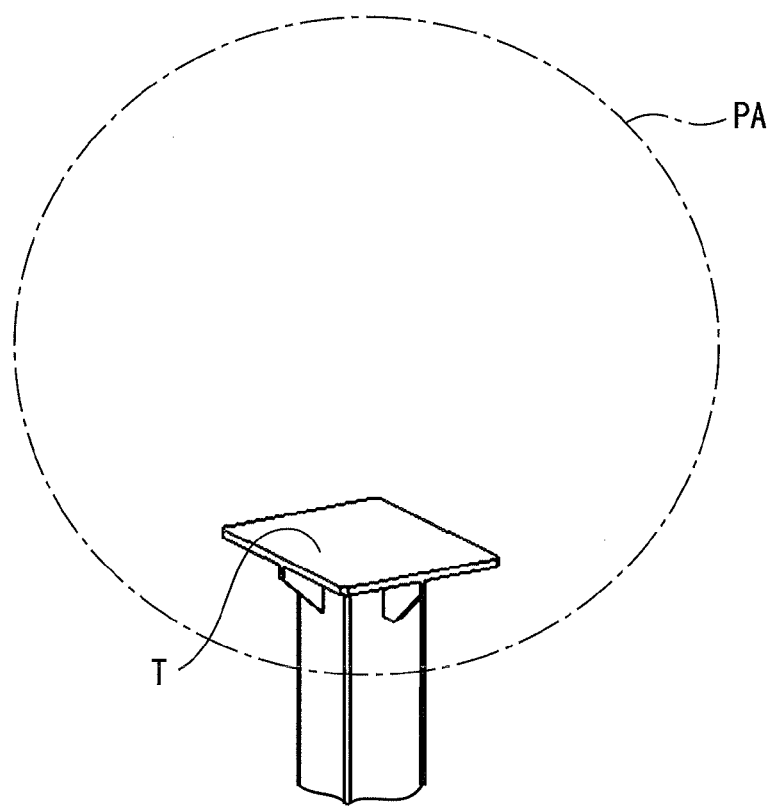
FIG. 4 is a perspective view which shows a second example of a preset permitted area.
Figure 5:
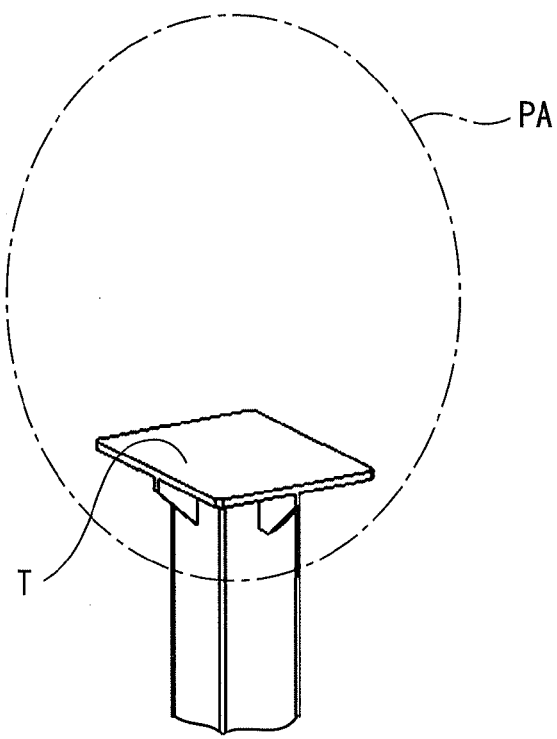
FIG. 5 is a perspective view which shows a third example of a preset permitted area.

FIG. 4 is a perspective view which shows a second example of a preset permitted area PA. In the present embodiment, a permitted area PA is set so that it has the shape of a sphere with a center point arranged above a table T. In this case, the operator, for example, can set a spherical permitted area PA by designating coordinates of the center point of the sphere according to the reference coordinate system and the length of the radius. Further, FIG. 5 is a perspective view which shows a third example of a preset permitted area PA. In the present embodiment, a permitted area PA is set so that it has the shape of a spheroid with two focal points arranged above a table T. In this case, the operator, for example, can set a spheroidal permitted area PA by designating coordinates of the two focal points of the spheroid according to the reference coordinate system and the lengths of the long axis and short axis radius. In the above way, an operator can set permitted areas PA which have various dimensions and shapes. Information on preset permitted areas PA can be stored as permitted area data in the storage part 10 of the control device C.

Again referring to FIG. 1, the control device C in the present example is provided with a storage part 10, motion control part 11, position calculating part 12, model placing part 13, judging part 14, and teaching operation restricting part 15. These parts of the control device C will be explained in detail below: The storage part 10 in the present example is a storage device including a ROM (Read Only Memory) and RAM (Random Access) etc. The storage part 10 in the present example can store the above-mentioned permitted area data and later explained hand model data etc. Further, the motion control part 11 in the present example has the function of generating motion commands for these parts of the robot R based on a teaching operation received by a teaching device I. The thus generated motion commands are transmitted to the drive motors 21 of the robot arm RA and the drive part 30 of a robot hand RH.

The position calculating part 12 in the present example has the function of calculating the robot hand position information which expresses the position and posture of the robot hand RH, based on the output data which is transmitted from the sensors 22 of the robot arm RA. In particular, the position calculating part 12 in the present example is designed to successively calculate robot hand position information based on the output data which is transmitted from the drive parts 22 at intervals of a predetermined cycle time. The robot hand position information which is calculated by the position calculating part 12 is transmitted to the model placing part 13. Further, the model placing part 13 in the present example has the function of virtually placing a 3D model of the robot hand RH which is prepared in advance, at a position expressed by robot hand position information. Such a 3D model will be called a "hand model HM" below.

Figure 6:
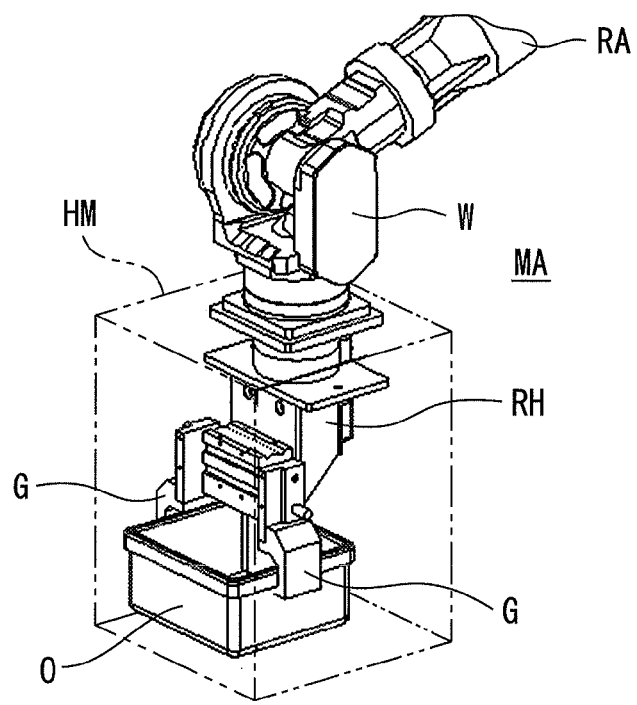
FIG. 6 is a perspective view which shows a hand model which is virtually placed by a model placing part of FIG. 1.

FIG. 6 is a perspective view which shows one example of a hand model HM. The hand model HM in the present example is obtained by modelling the robot hand RH to simplify the shape of the robot hand RH, and is arranged in line with a position expressed by the robot hand position information, that is, a position of the actual robot hand RH within the maximum area MA. The thus virtually placed hand model HM is used for judgment of whether the robot hand RH as a whole is present in the permitted area PA. Note that, the hand model HM of FIG. 6 has the shape of a box which circumscribes the robot hand RH, but the shape of the hand model HM in the robot system A of the present embodiment is not limited to this. That is, the operator can freely set a hand model HM corresponding to the shape of the actual robot hand RH. Information relating to the hand model HM which is set by the operator can be stored as hand model data in the storage part 10.

Referring again to FIG. 1, the judging part 14 in the present example has the function of judging if the robot hand RH as a whole is present in the permitted area PA, based on the above-mentioned robot hand position information. More specifically, the judging part 14 in the present example judges if the hand model HM virtually placed by the model placing part 13 is present as a whole in the permitted area PA. At this time, the judging part 14, for example, can compare the coordinates of various points of the permitted area PA and the coordinates of various points of the hand model HM both in a reference coordinate system in order to judge if the hand model HM as a whole is present in the permitted area PA. The coordinates of these points of the permitted area PA can, for example, be obtained from the permitted area data. Further, the coordinates of these points of the hand model HM can be calculated, for example, based on the robot hand position information. The results of judgment of the judging part 14 are transmitted to the teaching operation restricting part 15.

Figure 7:
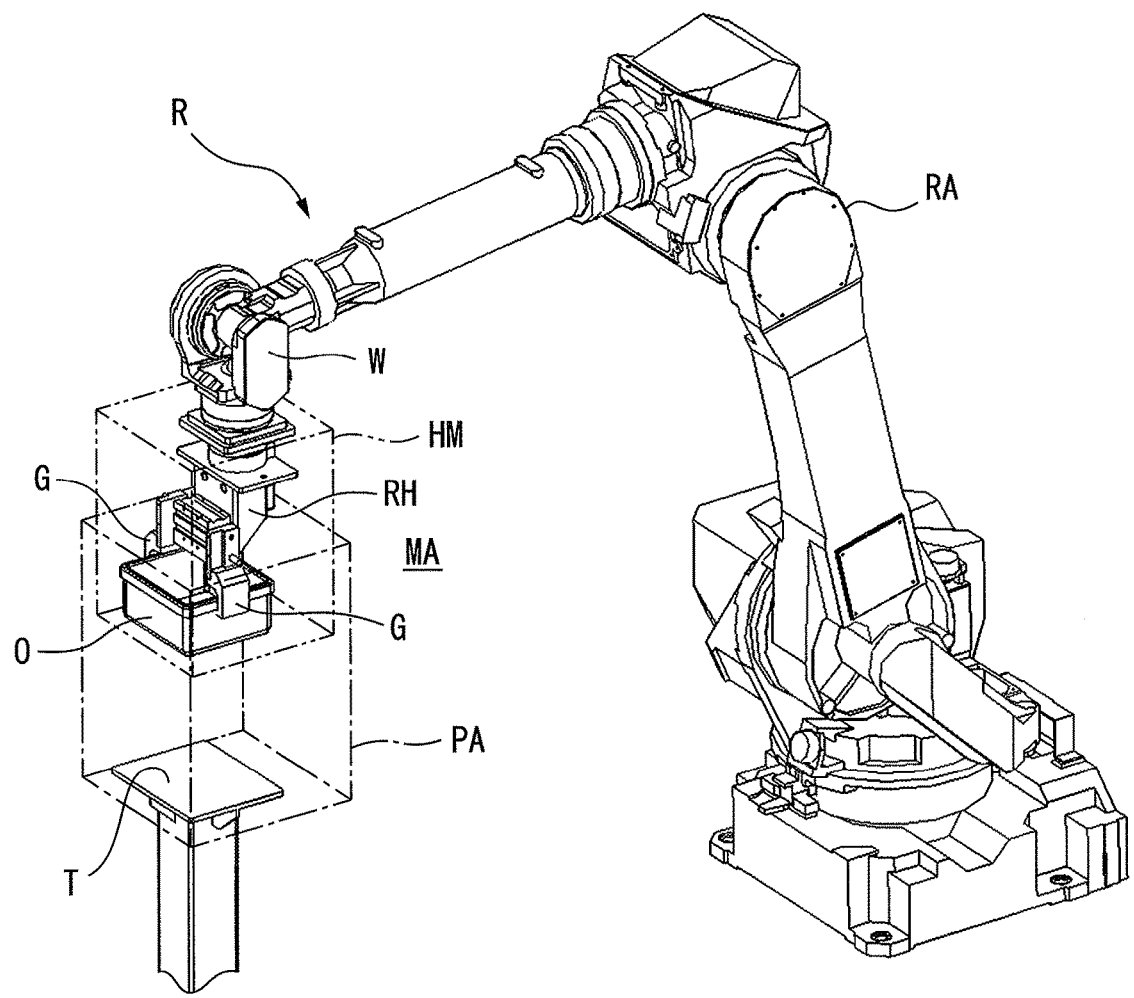
FIG. 7 is a perspective view which shows a state where the robot of FIG. 1 is conveying a conveyed object to a table.
Figure 8:
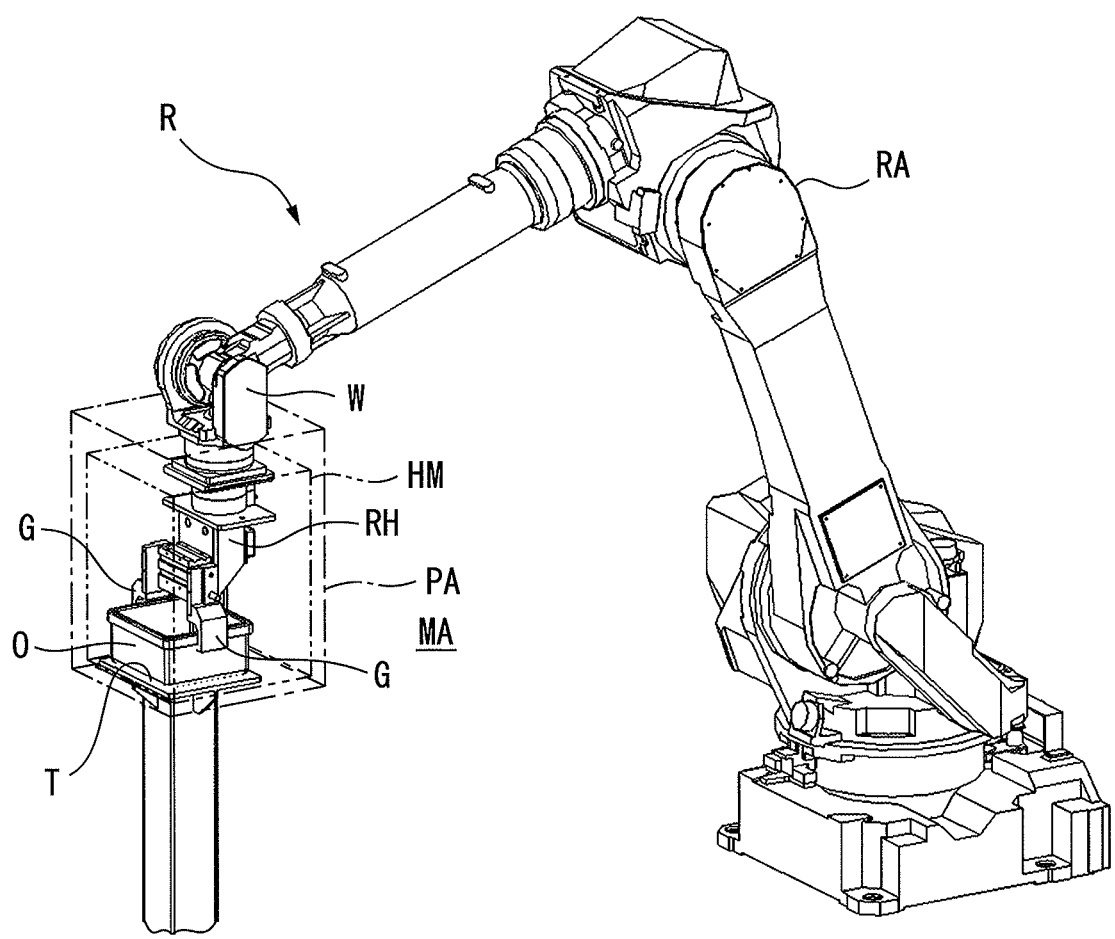
FIG. 8 is a perspective view which shows a state where the robot of FIG. 1 finished conveying a conveyed object to a table.

FIG. 7 is a perspective view which shows the state where the robot R of FIG. 1 is conveying a conveyed object O to a table T, while FIG. 8 is a perspective view which shows the state where the robot R of FIG. 1 already finished conveying the conveyed object O to the table T. The judging part 14 in the present example deems that the actual robot hand RH as a whole is not present in the permitted area PA when the hand model HM as a whole is not present in the permitted area PA as shown in FIG. 7, and deems that the actual robot hand RH as a whole is present in the permitted area PA when the hand model HM as a whole is present in the permitted area PA as shown in FIG. 8. In this way, in the robot system A in the present example, the hand model HM of a simplified shape of the robot hand RH (see FIG. 6) is used for judging whether the robot hand RH as a whole is present in the permitted area PA, and therefore the processing load on the judging part 14 can be lightened. Note that, the judging part 14 in the present example is designed to successively perform the above judgment, based on the robot hand position information which is calculated by the position calculating part 12 at a predetermined cycle time.

Again referring to FIG. 1, the teaching operation restricting part 15 in the present example has the function of restricting a teaching operation for the robot hand RH according to the results of judgment of the judging part 14. More specifically, the teaching operation restricting part 15 in the present example permits the teaching operation for the robot hand RH when it is judged that the robot hand RH as a whole is present in the permitted area PA as in FIG. 8, while prohibits the teaching operation for the robot hand RH when it is judged that the robot hand RH as a whole is not present in the permitted area PA as in FIG. 7. If the teaching operation for the robot hand RH is prohibited by the teaching operation restricting part 15, a predetermined warning message may be displayed on a not shown display screen of the teaching device I, for example.

If the teaching operation for the robot hand RH is permitted by the teaching operation restricting part 15, it is deemed that the motion of the robot hand RH based on that teaching operation is valid. On the other hand, if the teaching operation for the robot hand RH is prohibited, it is deemed that the motion of the robot hand RH based on that teaching operation is invalid. That is, the robot hand RH in the present example is rendered operable only when it is present as a whole in the permitted area PA, and is rendered inoperable otherwise. Due to this, a mistaken teaching operation for the robot hand RH can be prevented from causing the conveyed object O to drop off from the robot hand RH. Note that, even while the teaching operation restricting part 15 is prohibiting the teaching operation for the robot hand RH (see FIG. 7), the operator can freely operate the robot arm RA operate by means of the teaching operation for the robot arm RA. Due to this, the operator can make the robot hand RH travel so that the robot hand RH as a whole enters the permitted area PA.

Figure 9:
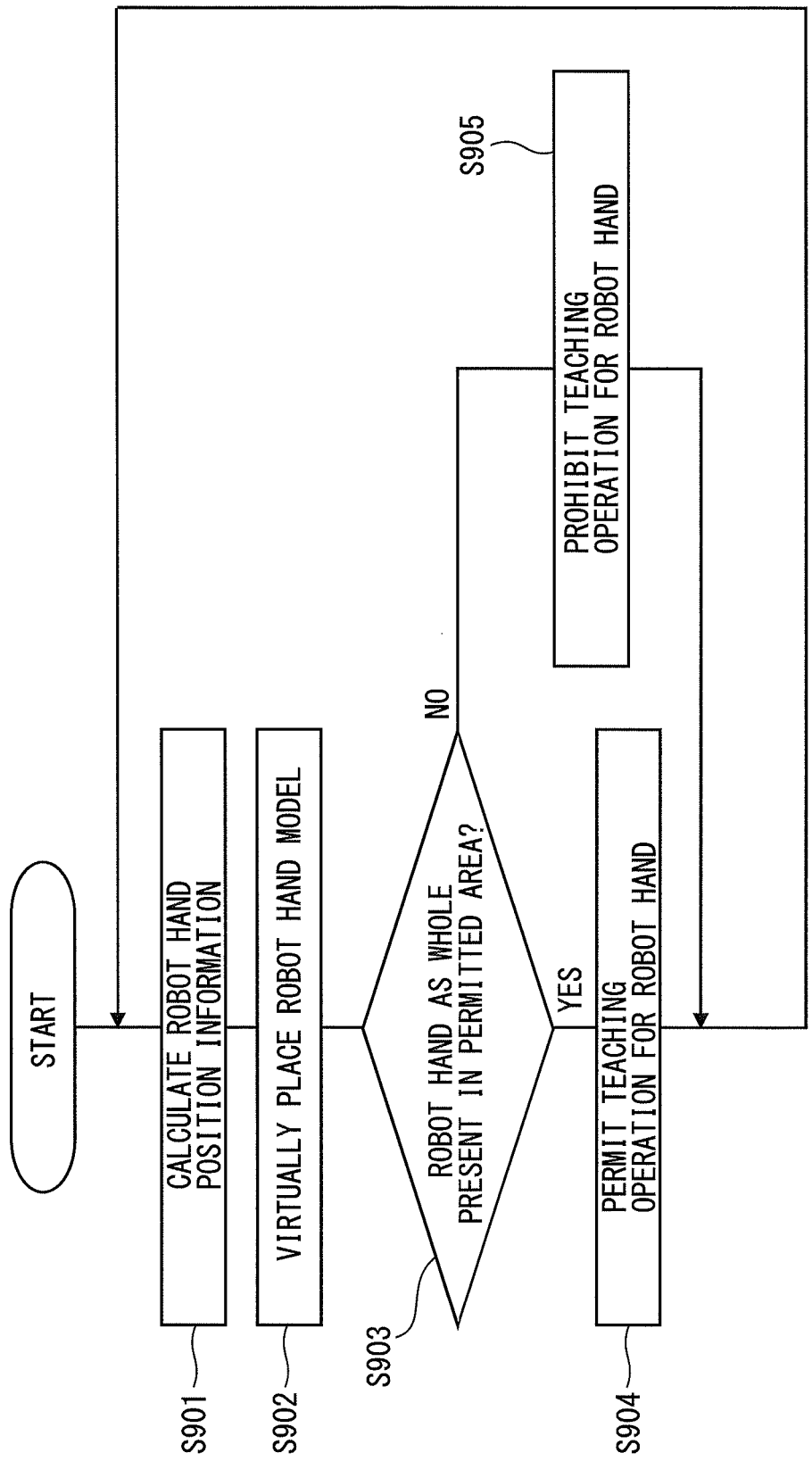
FIG. 9 is a flow chart which shows a procedure of processing where a control device of FIG. 1 restricts a teaching operation for a robot hand.

Next, the processing of the control device C in the robot system A of the present embodiment will be explained in summary with reference to a flow chart. FIG. 9 is a flow chart which shows a procedure of the processing where the control device C of FIG. 1 restricts the teaching operation for the robot hand RH. As shown in FIG. 9, first, at step S901, the position calculating part 12 calculate the robot hand position information, based on the output data of the drive part 22 on the robot arm RA. In this way, in the robot system A of the present example, the robot hand position information is calculated based on the output data of the existing drive part 22, and therefore there is no need to install a dedicated sensor for acquiring robot hand position information. Next, at step S902, the model placing part 13 virtually places the hand model HM which was prepared in advance, at the position which is expressed by the robot hand position information (see FIG. 6). Next, at step S903, the judging part 14 judges if the robot hand RH as a whole is present in the permitted area PA. At this time, the judging part 14 judges that the robot hand RH as a whole is present in the permitted area PA when the hand model HM placed at step S902 is present as a whole in the permitted area PA, while judges that the robot hand RH as a whole is not present in the permitted area PA when the hand model HM as a whole is not present in the permitted area PA.

Next, in accordance with the results of judgment at step S903, the teaching operation restricting part 15 restricts the teaching operation for the robot hand RH (step S904 and step S905). More specifically, when it is judged that the robot hand RH as a whole is present in the permitted area PA, a teaching operation for the robot hand RH is permitted (step S904). Due to this, the robot hand RH is rendered operable in accordance with a teaching operation. On the other hand, when it is judged that the robot hand RH as a whole is not present in the permitted area PA, a teaching operation for the robot hand RH is prohibited (step S905). Due to this, the robot hand RH is rendered inoperable regardless of the teaching operation, and therefore a mistaken teaching operation for the robot hand RH can be prevented from causing the conveyed object O to drop off from the robot hand RH. Next, the procedure from the above-mentioned step S901 onward is again performed. Therefore, when the robot hand RH is moved afterward by the teaching operation for the robot arm RA, the permitted/prohibited state of the teaching operation for the robot hand RH may be switched in accordance with the position of the robot hand.

In the above way, according to the robot system A in the present example, the teaching operation for the robot hand RH is restricted in accordance with the results of judgment of whether the robot hand RH as a whole is present in the predetermined permitted area PA. Further, in the robot system A in the present example, as shown in FIG. 3 to FIG. 5, a permitted area PA of the optimal shape corresponding to the shape of the robot hand RH can be set, and therefore it is possible to obtain accurate results of judgment of whether the robot hand RH as a whole is present in the permitted area PA. Further, in the robot system A of the present embodiment, the permitted/prohibited state of the teaching operation for the robot hand RH can be switched in accordance with the position of the robot hand RH, and therefore it is possible for the operator to accurately place the robot hand RH in the permitted area PA by moving the robot hand RH in small increments. Therefore, according to the robot system A in the present example, it is possible to improve operability when the operator performs a teaching operation for the robot hand RH and robot arm RA.

Figure 10:
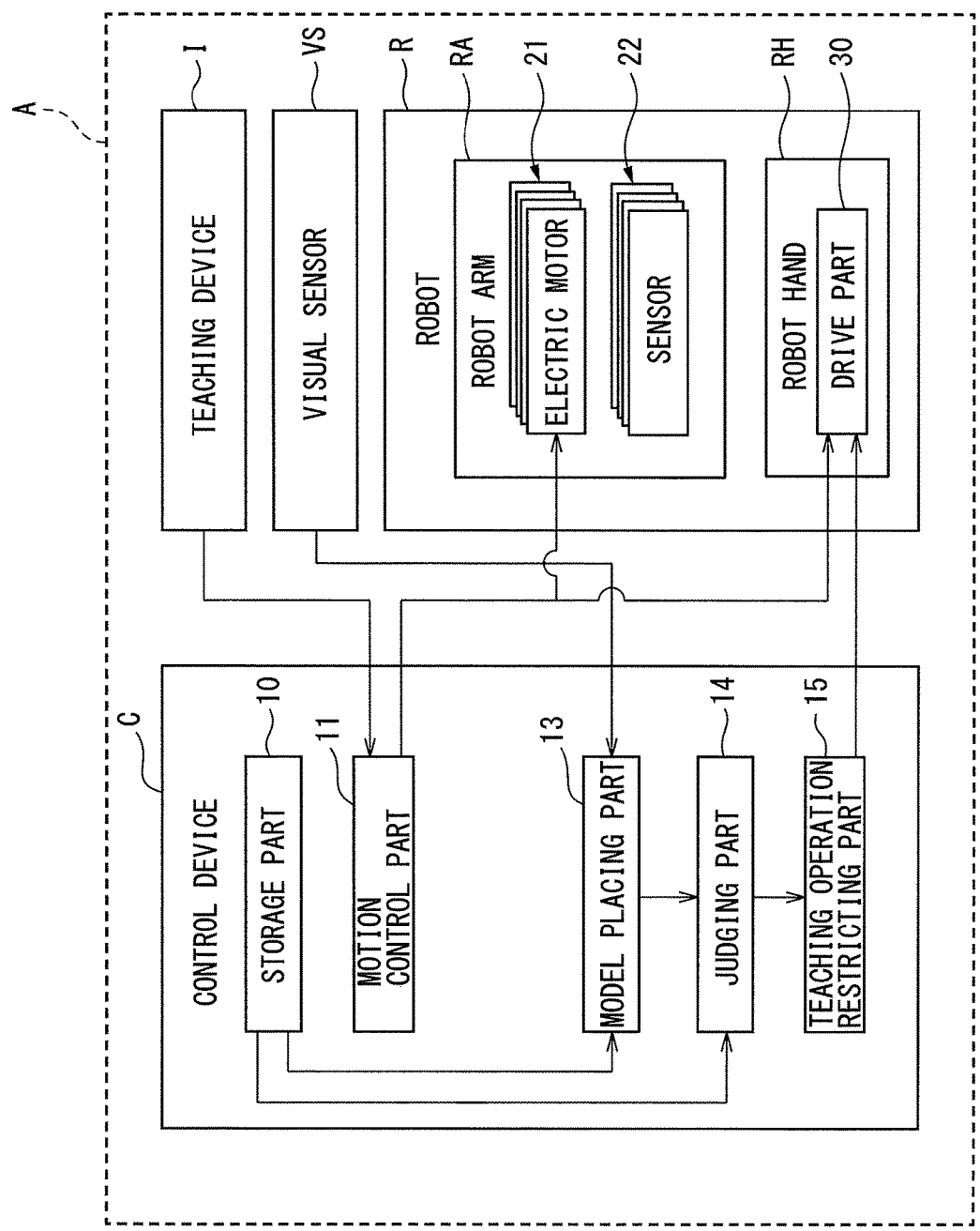
FIG. 10 is a block diagram which shows the configuration of a variation of the robot system of the present embodiment.

Next, a variation of a robot system of the present embodiment will be explained. FIG. 10 is a block diagram which shows the configuration of the robot system A in the present example. As shown in FIG. 10, the robot system A in the present example comprise not only the above-mentioned robot R, control device C, and teaching device I, but also a visual sensor VS which acquires an image of the robot hand RH. More specifically, the visual sensor VS in the present example is provided with a camera which acquires an image of the robot hand RH, and with an image processing device which detects a position and posture of the robot hand RH by image processing of the camera image. Further, information relating to the position and posture of the robot hand RH which is detected by the visual sensor VS, is transmitted as the robot hand position information to the model placing part 13 of the control device C, and is used for the judgment processing by the judging part 14. In this way, in the present embodiment, accurate robot hand position information can be acquired by the visual sensor VS, and therefore it is possible to obtain accurate results of judgment of whether the robot hand RH as a whole is present in the permitted area PA.

Effect of Invention

According to the first aspect of the present invention, a teaching operation for a robot hand is restricted in accordance with the results of judgment of whether a robot hand as a whole is present in a predetermined permitted area. Therefore, according to the first aspect, it is possible to prevent accidental dropping of a conveyed object which may be caused by a mistaken teaching operation for a robot hand which grips the conveyed object even if the robot is not provided with a dedicated sensor or mechanical part, etc.

According to the second aspect of the present invention, a permitted area of the optimal shape corresponding to the shape of the robot hand may be set, and therefore it is possible to obtain accurate results of judgment of whether the robot hand as a whole is present in the permitted area.

According to the third aspect of the present invention, an existing sensor on the robot arm is used to calculate the robot hand position information, and therefore it is possible to eliminate the need to install a dedicated sensor for acquiring robot hand position information.

According to the fourth aspect of the present invention, accurate robot hand position information is generated based on the image of the robot hand, and therefore it is possible to obtain accurate results of judgment of whether the robot hand as a whole is present in the permitted area.

According to the fifth aspect of the present invention, a hand model of the simplified shape of the robot hand is used for judgment of whether the robot hand as a whole is present in the permitted area, and therefore it is possible to lighten the processing load on the judging part.

According to the sixth aspect of the present invention, a box shaped hand model is used for judgment of whether the robot hand as a whole is present in the permitted area, and therefore it is possible to lighten the processing load on the judging part.

According to the seventh aspect of the present invention, the permitted/prohibited state of the teaching operation for the robot hand may be switched in accordance with the position of the robot hand, and therefore it is possible for the operator to move the robot hand in small increments, and thereby accurately place the robot hand in the permitted area. Therefore, according to the seventh aspect, it is possible to improve operability of the robot system when the operator performs a teaching operation for the robot hand and robot arm.

According to the eighth aspect of the present invention, the gripping force of the robot hand is easily controlled, and it is possible to handle various types of conveyed objects.

Figure 11:
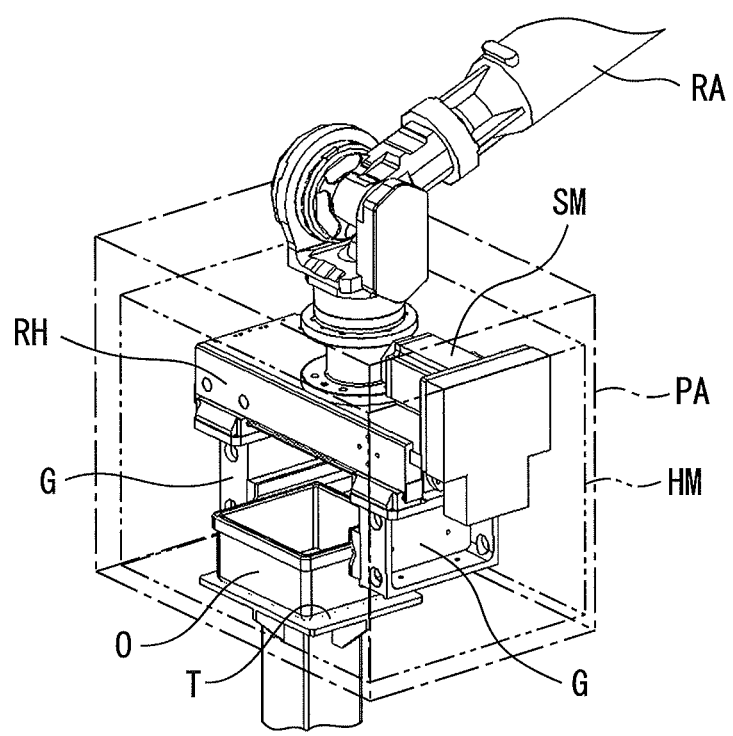
FIG. 11 is a perspective view which shows an example of a servo-driven robot hand which can be employed for a robot system of the present invention.

The present invention is not limited to only the above embodiments and can be modified in various ways within the scope described in the claims. For example, in the above embodiment, a fluid-pressure type robot hand RH is illustrated, however the robot hand in the robot system of the present invention may be a servo-driven type robot hand, for example. FIG. 11 is a perspective view which shows an example of a servo-driven type robot hand RH which can be employed for the robot system of the present invention. As shown in FIG. 11, the robot hand RH in the present example is provided with a pair of grippers G, G which can grip a conveyed object, and with a servo motor SM which drives the pair of grippers G, G. In general, gripping force of a servo-driven type robot hand can be easily controlled, and therefore according to the robot hand RH in the present example, it is possible to handle a wide variety of conveyed objects O. Further, the robot hand in the robot system of the present invention may also be one which grips a conveyed object by magnetic force or vacuum suction force etc. instead of one which grips a conveyed object by driving a pair of grippers.

The invention claimed is:

1. A robot system comprising a robot which is provided with a robot arm having a wrist part and with a robot hand attached to said wrist part, and a control device which controls the motion of said robot, wherein
a permitted area where a teaching operation for said robot hand should be permitted is preset above a table that is within a maximum area which said robot hand can reach, and that an object to be conveyed by said robot hand can be placed on, wherein the permitted area has a shape covering less than all of the robot arm, and
said control device comprises
a judging part which judges if said robot hand as a whole is present in said permitted area, based on robot hand position information which expresses a position and posture of said robot hand and a teaching operation restricting part which permits a teaching operation for said robot hand when it is judged that said robot hand as a whole is present in said permitted area, and prohibits a teaching operation for said robot hand when it is judged that said robot hand as a whole is not present in said permitted area.

2. The robot system according to claim 1, further comprising a sensor which detects the position and posture of the wrist part of said robot, wherein said control device further comprises a position calculating part which calculates said robot hand position information based on information detected by said sensor.

3. The robot system according to claim 1, further comprising a visual sensor which acquires an image of said robot hand and generates said robot hand position information based on the image of said robot hand.

4. The robot system according to claim 1, further comprising a model placing part which virtually places a hand model which is obtained by modeling said robot hand to simplify the shape of said robot hand, at a position expressed by said robot hand position information, wherein said judging part judges that said robot hand as a whole is present in said permitted area when said hand model as a whole is present in said permitted area and judges that said robot hand as a whole is not present in said permitted area when said hand model as a whole is not present in said permitted area.

5. The robot system according to claim 4, wherein said hand model has a box shape which circumscribes said robot hand.

6. The robot system according to claim 1, wherein said judging part successively judges if said robot hand as a whole is present in said permitted area while said robot hand is moving.

7. The robot system according to claim 1, wherein said robot hand is a servo-driven robot hand.

8. A robot system comprising a robot which is provided with a robot arm having a wrist part and with a robot hand attached to said wrist part, and a control device which controls the motion of said robot, wherein a permitted area where a teaching operation for said robot hand should be permitted is preset above a table that is within a maximum area which said robot hand can reach, and that an object to be conveyed by said robot hand can be placed on, and said control device comprises a judging part which judges if said robot hand as a whole is present in said permitted area, based on robot hand position information which expresses a position and posture of said robot hand and a teaching operation restricting part which permits a teaching operation for said robot hand when it is judged that said robot hand as a whole is present in said permitted area, and prohibits a teaching operation for said robot hand when it is judged that said robot hand as a whole is not present in said permitted area, wherein said permitted area has the shape of a convex polyhedron, sphere, or spheroid.

* * * * *